US009630594B2

(12) United States Patent
Irwin

(10) Patent No.: US 9,630,594 B2
(45) Date of Patent: Apr. 25, 2017

(54) MATERIALS REMOVAL ASSEMBLY FOR VEHICLES

(71) Applicant: WINIX DEVELOPMENTS, INC., Alliston, Ontario (CA)

(72) Inventor: Mark Irwin, Alliston (CA)

(73) Assignee: WINIX DEVELOPMENTS, INC., Brooklin, Ontario (CA)

( * ) Notice: Subject to any disclaimer, the term of this patent is extended or adjusted under 35 U.S.C. 154(b) by 322 days.

(21) Appl. No.: 14/189,779

(22) Filed: Feb. 25, 2014

(65) Prior Publication Data

US 2014/0238439 A1   Aug. 28, 2014

Related U.S. Application Data

(60) Provisional application No. 61/769,002, filed on Feb. 25, 2013.

(51) Int. Cl.
*B60S 3/04*   (2006.01)
*B60S 3/06*   (2006.01)

(52) U.S. Cl.
CPC .. *B60S 3/06* (2013.01); *B60S 3/04* (2013.01)

(58) Field of Classification Search
CPC ...... B60S 3/04; B60S 3/00; B60S 3/06; E01H 8/04
USPC ............................. 15/97.3; 37/214, 231–233
See application file for complete search history.

(56) References Cited

U.S. PATENT DOCUMENTS

| | | | | |
|---|---|---|---|---|
| 4,724,565 A | * | 2/1988 | Higaki | B64F 5/0018 15/53.2 |
| 2012/0198636 A1 | * | 8/2012 | Edwards, III | B60S 3/04 15/93.1 |
| 2012/0233793 A1 | * | 9/2012 | Quinn | B60S 3/04 15/97.3 |

* cited by examiner

*Primary Examiner* — Laura C Guidotti
(74) *Attorney, Agent, or Firm* — Duane Morris LLP; J. Rodman Steele, Jr.; Gregory M. Lefkowitz

(57) ABSTRACT

A materials removal assembly for clearing materials from a horizontal surface, such as for removing snow or precipitation from a top surface on a vehicle. The assembly has a beam; a first coupling connected to a first end of the beam; a second coupling connected to the first coupling; and a blade assembly connected to the second coupling. The first coupling permits rotation of the second coupling and the blade assembly above and below a longitudinal axis of the beam. The second coupling permits rotation of the blade assembly about a first vertical axis transverse to the longitudinal axis of the beam. In one embodiment, movement of the materials removal assembly causes rotation of the blade assembly and movement of the materials to a side of the vehicle.

20 Claims, 16 Drawing Sheets

MATERIALS REMOVAL ASSEMBLY FOR VEHICLES

RELATED APPLICATIONS

The present application claims priority from U.S. provisional application No. 61/769,002 filed Feb. 25, 2013, the contents of which are hereby incorporated by reference.

TECHNICAL FIELD

The present invention relates to an assembly for removing material such as snow from vehicles, such as transport vehicles or trailers, and a method of removing snow from such vehicles.

BACKGROUND

Currently, removing material such as snow which accumulates on the tops of semi-trailers, trucks and other freight transport vehicles involves the use of a stationary system which may be provided by a transport company but which requires continual upkeep in order to be in a condition for drivers to use. Other devices and methods may require a driver to get on top of the vehicle to manually remove snow. Depending on local regulations and the height of the vehicle, some methods may require that the driver work with the use of an arrest fall system. Thus there is a need for an improved assembly for removing material such as snow from vehicles.

SUMMARY

According to one embodiment of the present disclosure there is provided a materials removal assembly for clearing materials from a vehicle. The assembly comprises a beam; a first coupling connected to a first end of the beam; a second coupling connected to the first coupling; and a blade assembly connected to the second coupling. The first coupling is configured to permit rotation of the second coupling and the blade assembly above and below a longitudinal axis of the beam. The second coupling is configured to permit rotation of the blade assembly about a first vertical axis transverse to the longitudinal axis of the beam.

According to one embodiment of the present disclosure there is provided a method of removing materials from a horizontal surface of a vehicle. The method comprises engaging a materials removal assembly, as described above, with an operator vehicle; raising and moving the materials removal assembly over the surface of the vehicle; lowering the materials removal assembly to engage at least a portion of the surface the vehicle; and moving the operator vehicle and materials removal assembly in a direction parallel to or alongside a longitudinal axis of the vehicle being cleared. In one embodiment, movement of the materials removal assembly causes rotation of the blade assembly and movement of the materials off the surface of the vehicle to a side of the vehicle. In one embodiment, materials are moved off a side of the vehicle opposite the operator vehicle.

Further embodiments of the present disclosure provide a snow removal assembly for a vehicle comprising: a beam; a guide rail assembly rotatably coupled to the beam; a snow removal device coupled to the beam and configured to remove snow from a top of the vehicle. The snow removal device is configured to move materials such as snow off of the top of the vehicle and to the side of the vehicle as the assembly travels along the length of the vehicle. In one embodiment, the snow removal assembly can be engaged by an operator vehicle, such as but not limited to a telehandler, a front-end loader or wheel loader. Thus, the snow removal assembly may be portable and can be taken to a vehicle which requires clearing. In one embodiment, the snow removal assembly includes a load sensing system allowing an operator to monitor and adjust the weight applied to the vehicle. The load sensing system may include suspension means to support a portion of the weight of the snow removal device. In one embodiment, the assembly is configured to be detached from the operator vehicle, turned over and re-engaged for operation from either side of the vehicle. The assembly includes self-aligning features to ensure it is mounted atop a vehicle without damage to the vehicle.

Embodiments of the present disclosure provide a method of removing precipitation such as snow from a top of a vehicle comprising engaging a snow removal assembly with an operator vehicle, the snow removal assembly comprising: a beam having an operator coupling; a guide rail assembly rotatably coupled to the beam; a snow removal device coupled to the guide rail assembly and configured to remove snow from the top of the vehicle; raising and moving the snow removal assembly over the top of the vehicle; lowering the snow removal assembly to engage a portion of the top of the vehicle; and moving the operator vehicle and snow removal assembly in a direction parallel to a longitudinal axis of the vehicle, wherein movement of the snow removal assembly causes movement of the snow to a side of the vehicle.

BRIEF DESCRIPTION OF THE DRAWINGS

Like reference numerals are used in the drawings to denote like elements and features.

While the invention will be described in conjunction with the illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF EXAMPLE IMPLEMENTATIONS

Embodiments of the present disclosure provide a materials removal assembly which is configured for use in removing or clearing material from the top of a vehicle. It will be understood that such materials may include precipitation such as snow, hail, slush, ice, or sleet, or any other materials which may accumulate on and be brushed or moved off of a horizontal surface or top of a vehicle. The assembly is configured for use to remove materials from vehicles which may include but are not limited to transport vehicles, container vehicles, semi-trailers, vans, trucks, and cube vans. In one embodiment, the assembly is configured to remove materials from a flat surface of the vehicle which may include but is not limited to the roof or top of the vehicle. In one embodiment, the assembly is engaged by an operator vehicle and transported to the vehicle to be cleared. The operator vehicle may be any vehicle configured to engage, lift, lower and move the assembly, such as but not limited to a telehandler, front-end wheel loader, or forklift. As the operator vehicle and materials removal assembly move in a direction parallel to or alongside the vehicle, materials are moved off to a side of the vehicle opposite the operator vehicle. In one embodiment, the assembly may be turned over for operation on either side of the vehicle being cleared. In additional embodiments, the assembly may be configured and used for removing materials from underneath portions of the vehicle.

FIGS. 1 to 4 illustrate a materials removal assembly 10 in accordance with one embodiment of the present disclosure. While the embodiments described with respect to FIGS. 1 to 4 show an assembly which is configured for use from either side of a vehicle being cleared of materials, it will be appreciated that, as described further below, modifications may be implemented to provide an assembly which operates only on one side of a vehicle. It also will be appreciated that a "side" of a vehicle is relative and for the purposes of discussion, may refer to "driver side" or "passenger side" of a vehicle. Further, terms such as "upper", "lower", "top" and "bottom" are used to provide a description of the assembly 10 when in a particular configuration for use on one side of a vehicle and it will be appreciated that similar terms may apply to different elements when the assembly 10 is in a configuration for use on an opposite side of the vehicle.

Figure 3:
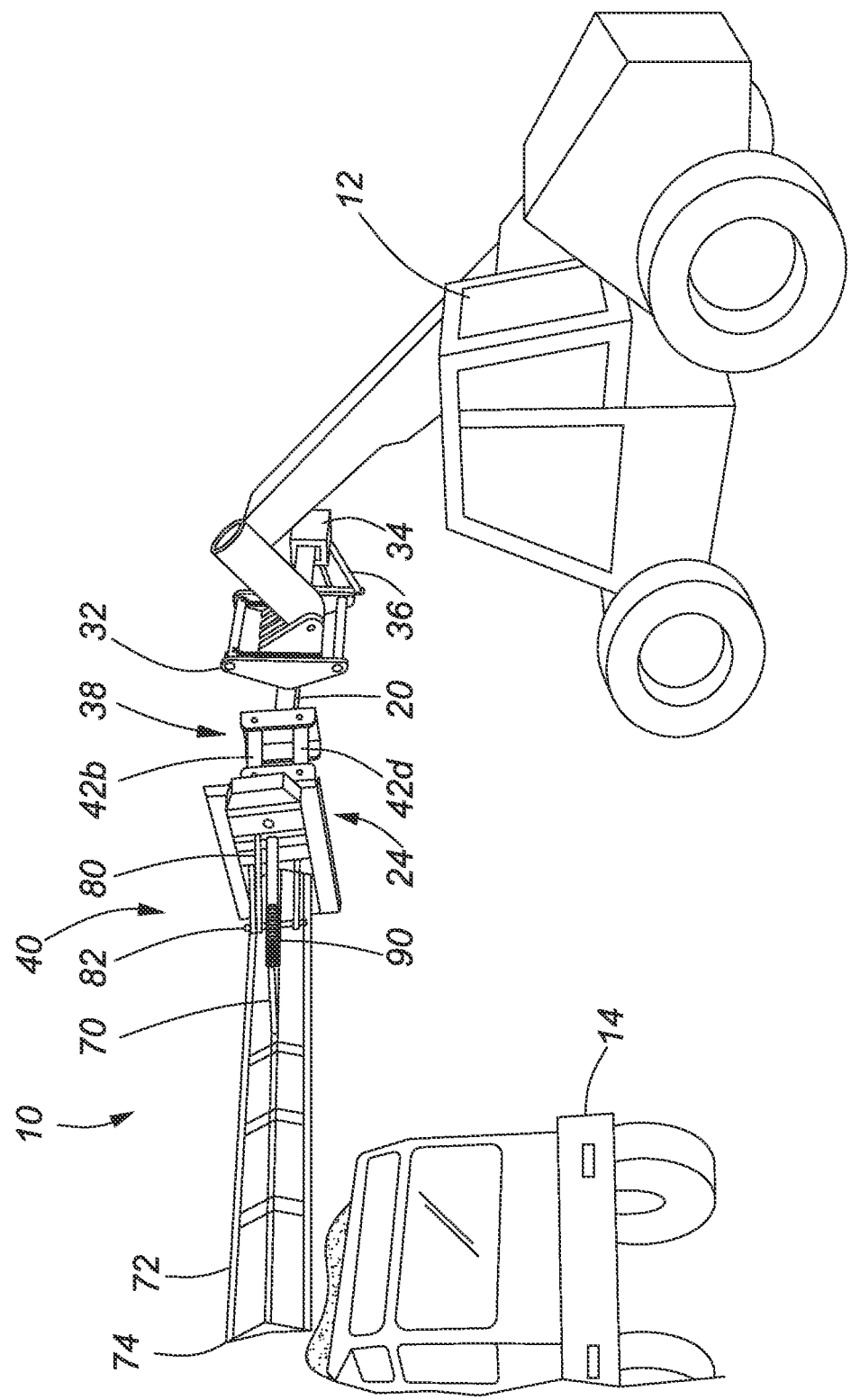
FIG. 3 illustrates rear perspective view of an embodiment of a materials removal assembly according to one embodiment of the present disclosure, in use.
Figure 4:
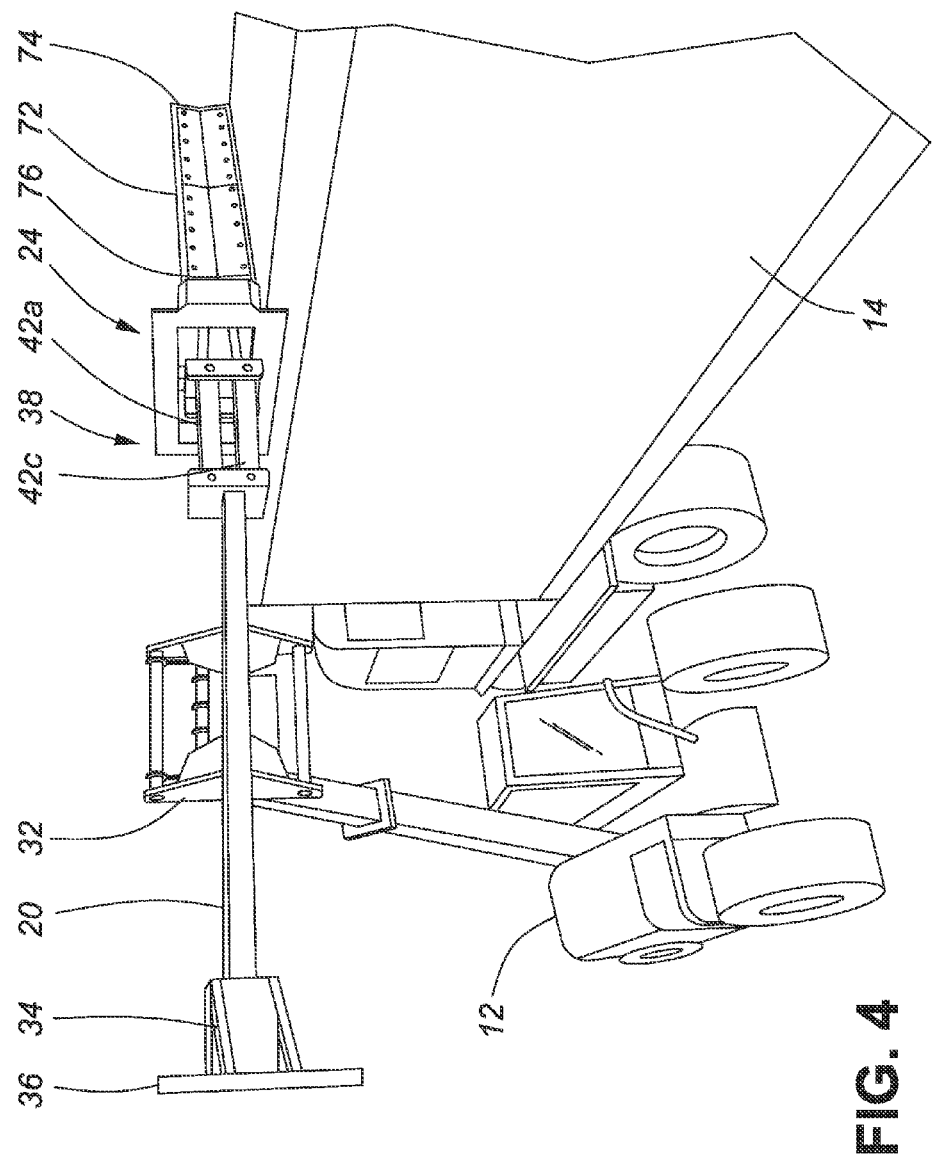
FIG. 4 illustrates a front perspective view of an embodiment of a materials removal assembly according to one embodiment of the present disclosure, in use.

FIGS. 3 and 4 illustrate the assembly 10 being engaged and used by an operator vehicle 12 for clearing snow from a vehicle 14. While the operator vehicle 12 is shown as a telehandler, and the vehicle 14 is shown as a trailer, as noted above, the assembly 10 is not limited to use with these vehicles. The assembly 10 also may be used to remove other forms of precipitation or other materials from the top of the vehicle 14 or to remove other forms of precipitation or other materials from underneath the vehicle 14.

Figure 19:
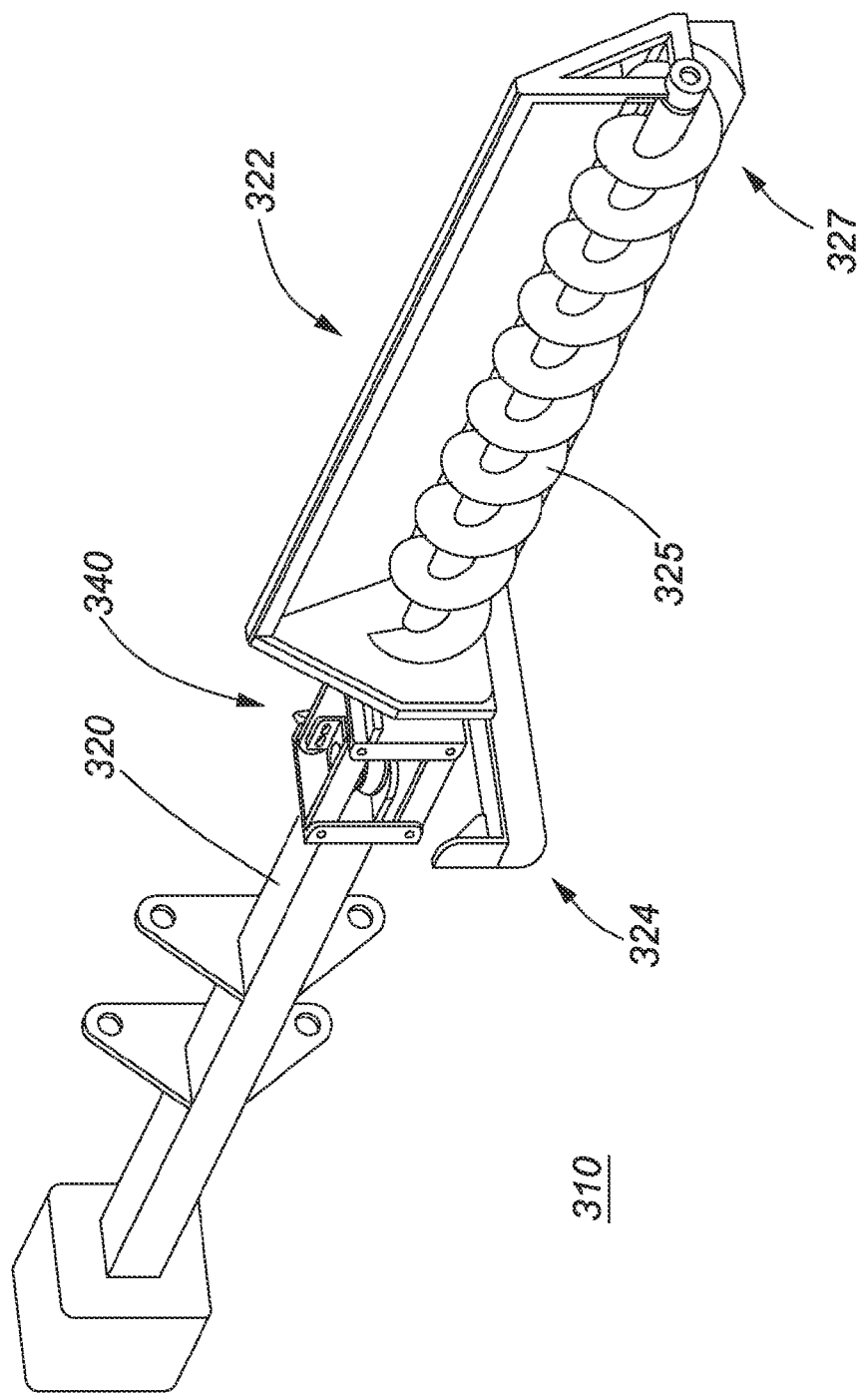
FIG. 19 is a perspective view of a materials removal assembly according to a further embodiment of the present disclosure.

The materials removal assembly 10 includes a beam 20 which, in one embodiment, is coupled to a blade assembly 22. As described below, the blade assembly 22 is configured at an angle or may be rotated to an angle such that, as the assembly 10 is moved along a length of the vehicle 14, materials on top of the vehicle, such as snow, are pushed by the blade assembly 22 to a side of the vehicle 14 opposite the operator vehicle 12. In some embodiments, a guide rail assembly 24 is coupled to the beam 20 and blade assembly 22. The guide rail assembly 24 may be provided to ensure proper engagement with and alignment of the assembly 10 with the vehicle 14 to be cleared. In other embodiments, the materials removal assembly 10 comprises the beam 20 coupled to an auger assembly as illustrated in FIG. 19.

The beam 20 includes an operator coupling 30 which allows an operator vehicle 12, to engage, lift and operate the assembly. In one embodiment, a telehandler bracket 32 is fixed to the beam 20 such as by welding. In another embodiment, an extension is provided (not shown) for the operator coupling 30 to extend to a wheel loader so that the assembly 10 may be raised above and over a vehicle using the wheel loader.

In one embodiment, the assembly 10 includes a counterweight 34 coupled to the beam 20 to offset the weight of the blade assembly 22 or auger assembly. In one embodiment, the assembly 10 is symmetrical and may be operated from either side of the vehicle. In another embodiment, as illustrated in FIGS. 3 and 4, a frame 36 is provided on the counterweight 34 to enable the assembly 10 to rest in a balanced position or stand on end for engagement and operation on the opposite side of the vehicle.

In use, the assembly 10 may be taken to the location of the vehicle 14 to be cleared. The vehicle 14 may be on level ground or ground which slopes between the front of the vehicle 14 and the rear, and/or ground which slopes between a first side and a second side of the vehicle 14. In one embodiment, the beam 20 and the blade assembly 22 are connected by a first coupling 38 and a second coupling 40, as can be seen in FIGS. 1 to 4. As the blade assembly 22 engages the vehicle 14, as described in detail below, it is permitted to rotate relative to the beam 20 to account for the vehicle sitting on uneven ground. In one embodiment, the first coupling 38 provides a gimble type of effect so that the beam 20 may be fixedly engaged by the operator vehicle 12 and the blade assembly 22 may be substantially parallel to the top surface of the vehicle 14. In one embodiment, the first coupling 38 permits rotation or pivoting of the guide rail assembly 24 and the blade assembly 22 above and/or below a longitudinal axis of the beam 20, which is shown for illustration purposes as an x-axis in FIG. 2.

In one embodiment, the first coupling 38 comprises multiple arms 42 connecting the beam 20 and the blade assembly 22 and the guide rail assembly 24. In one embodiment, as can be seen from FIGS. 4 and 5, four arms 42*a*, 42*b*, 42*c*, 42*d* are rotatably configured between the beam 20 and the blade assembly 22 and the guide rail assembly 24 in order to support the weight of the blade assembly 22 and the guide rail assembly 24 and permit rotation of the blade assembly 22 and the guide rail assembly 24 relative to the beam 20. The arms 42*a*, 42*b*, 42*c*, 42*d* may be configured symmetrically so that the assembly 10 may be turned over and used from either side of the vehicle.

Figure 5:
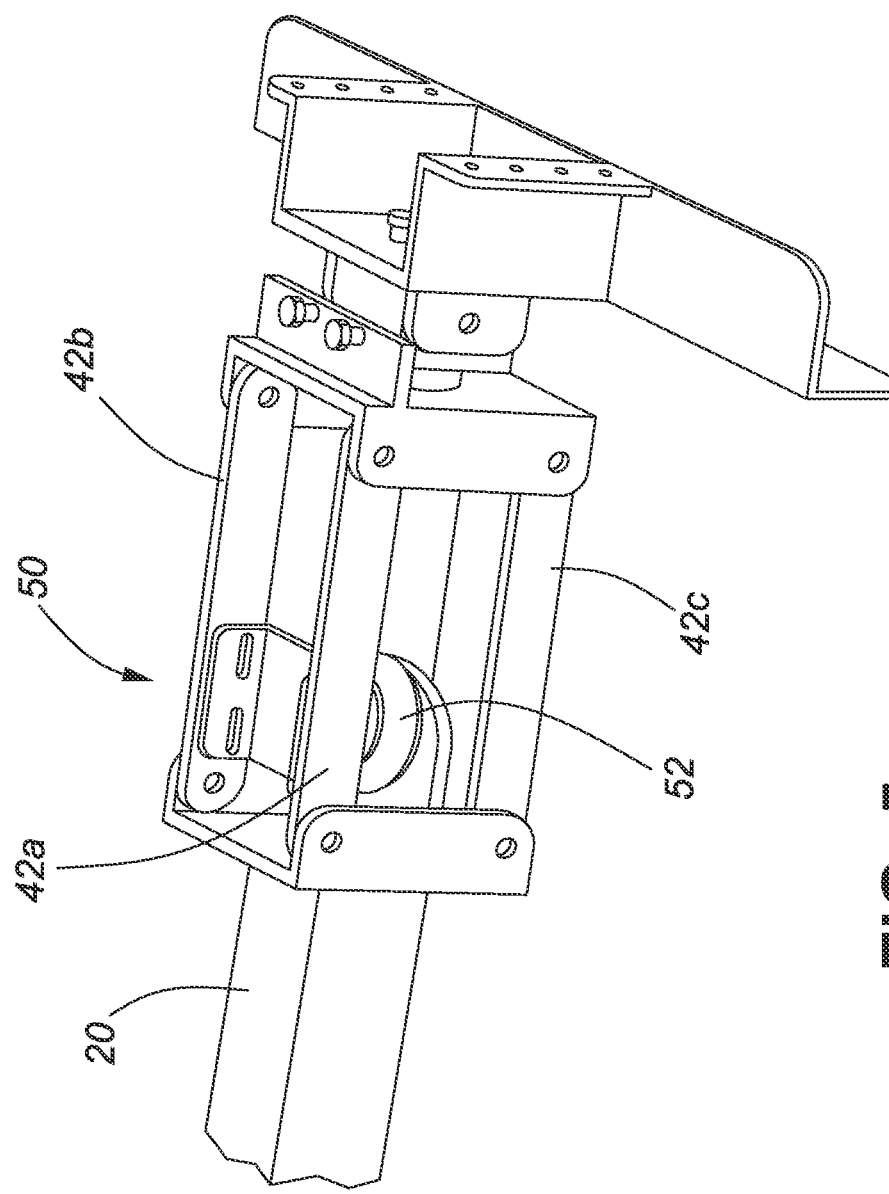
FIG. 5 is a front perspective view of a portion of a materials removal assembly suspension and load sensing system according to one embodiment of the present disclosure.
Figure 6:
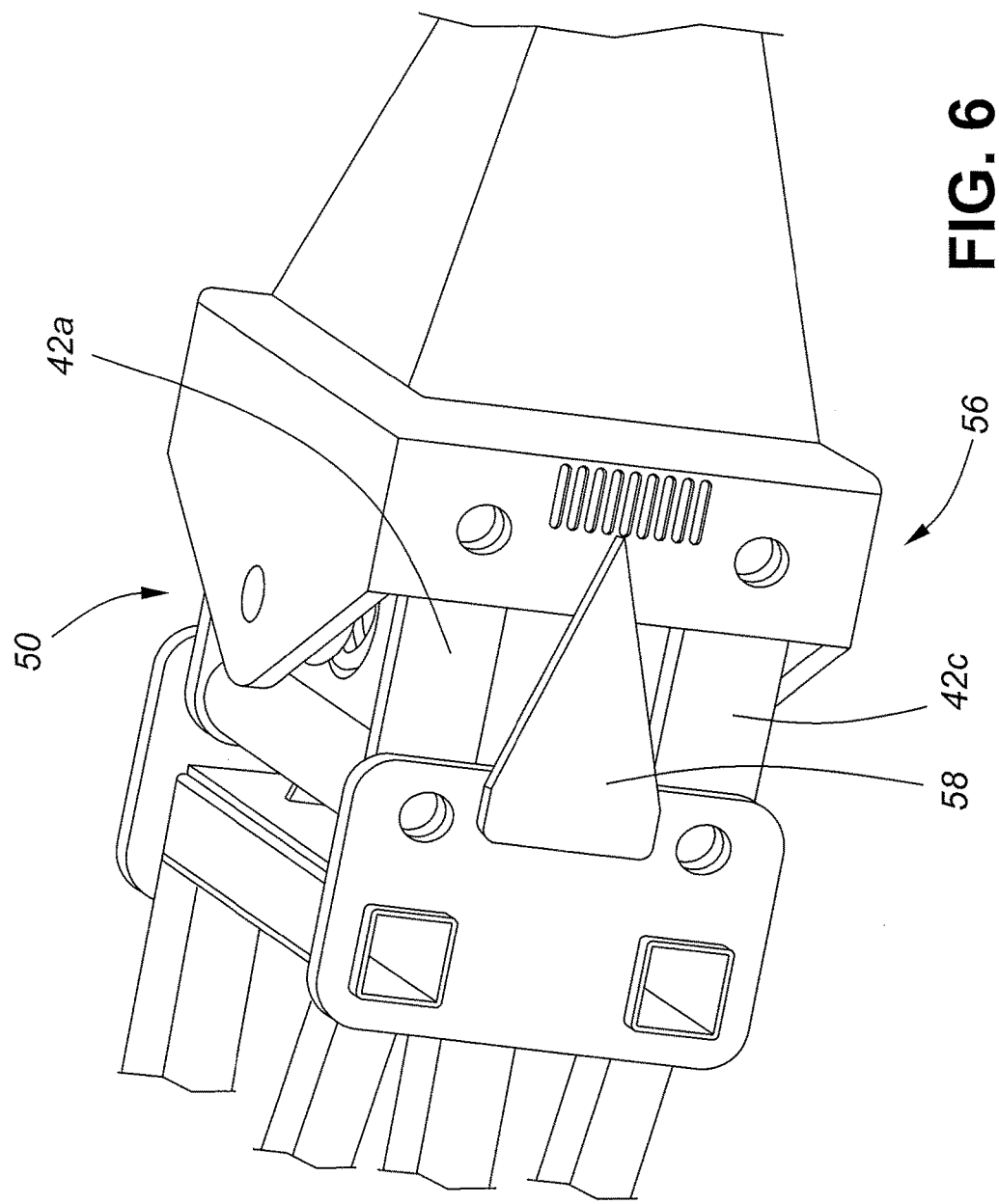
FIG. 6 is a front perspective view of a portion of a materials removal assembly suspension and load sensing system according to another embodiment of the present disclosure.

In some embodiments, the assembly 10 includes a suspension system 50 as shown, for example, in the views of FIGS. 5 and 6. The suspension system 50 operates so that a portion of the load of the blade assembly 22 and guide rail assembly 24 is supported by the beam 20 when the assembly 10 is in use in order to reduce the load on the top of the vehicle 14 which is being cleared of materials. In one embodiment, the suspension system 50 comprises suspension means 52 such as an airbag device. In one embodiment, the suspension system 50 is provided within the arms 42 of the first coupling 38 to exert an upward force on the upper arms 42*a*, 42*b* of the coupling 38 and to deflect the load from the top of the vehicle. It will be appreciated that if the assembly 10 is configured for use on the opposite side of the vehicle, a different set of arms, arms 42*c*, 42*d*, would be considered the upper arms.

In some embodiments, the first coupling 38 includes a load sensing system and a load indicator 56 to provide feedback to an operator of the load being applied to the top of the vehicle. The load indicator 56 may be configured to provide visual feedback of a range of acceptable loads on the vehicle. In one embodiment, the load indicator comprises an arm or pointer 58 which moves relative to the load, as shown, for example, in FIGS. 3 and 6. In other embodiments (not shown), the suspension system 50 and load sensing system may be controlled hydraulically or by computer control and the load indicator 56 may be configured to provide audible or other types of feedback or computer feedback signals.

Figure 1:
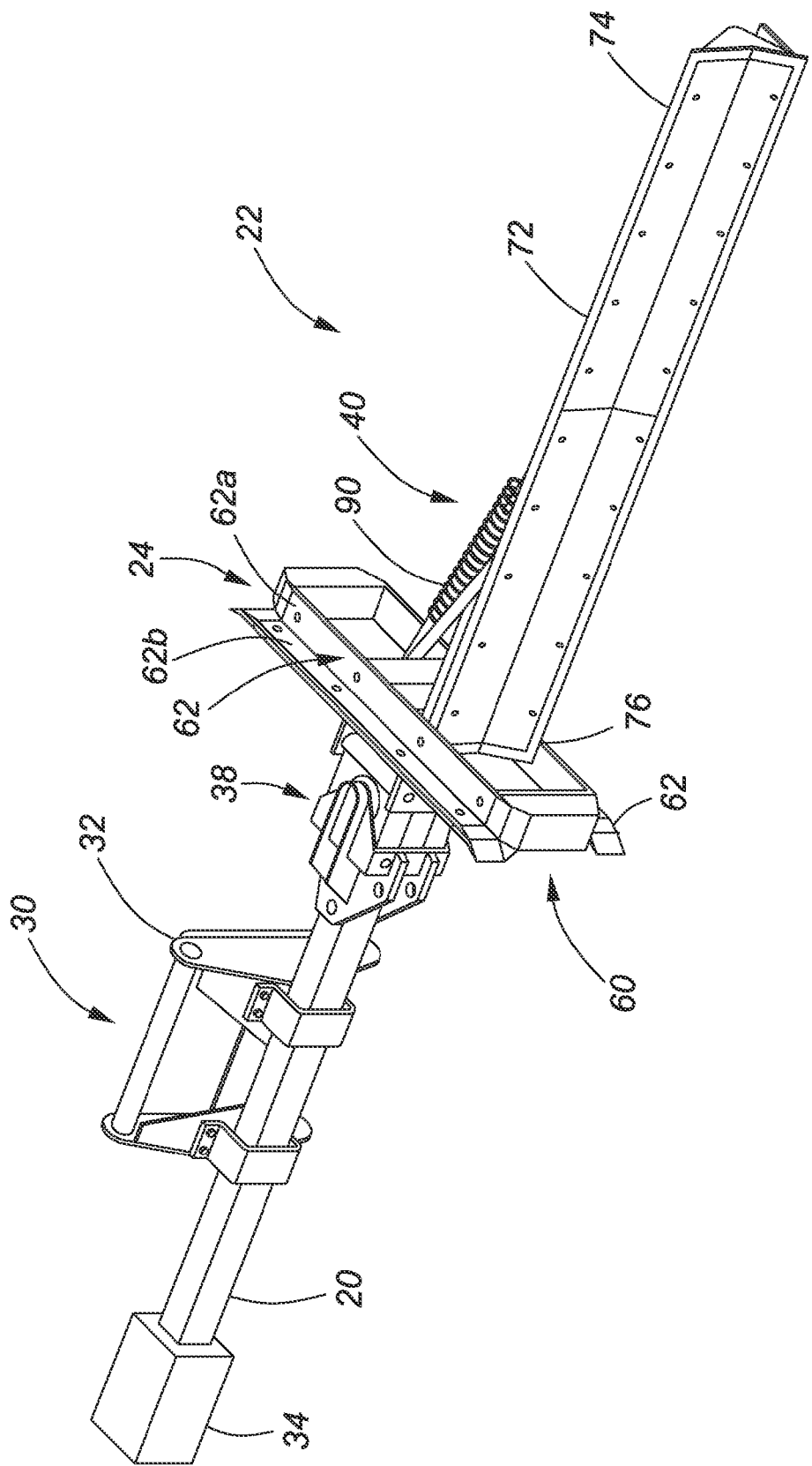
FIG. 1 is a front perspective view of a materials removal assembly in a first position according to one embodiment of the present disclosure.

In one embodiment, the guide rail assembly 24 is provided on the materials removal assembly 10 and is configured to ensure proper engagement with and alignment of the assembly 10 with the vehicle to be cleared. The guide rail assembly 24 also may support and engage the blade assembly 22 as described below. In one embodiment, as shown in FIG. 4, the guide rail assembly 24 is configured to engage and rest on a guide rail of the vehicle 14 to be cleared, such as a top guide rail of a semi-trailer. The guide rail assembly 24 comprises at least one guide rail arm 60 which extends transverse to the beam 20 and rests on a portion of the guide rail of the vehicle to be cleared. The guide rail arm 60 may comprise one or more brackets 62 as shown in FIG. 1 with a first portion 62*a* resting on the guide rail of the vehicle 14 and a second portion 62*b* sitting adjacent to a side of the vehicle during use. In one embodiment, the first portion 62*a* and second portion 62*b* are at right angles. In one embodiment, the guide rail arm 60, the first portion 62*a* of the bracket 62, the second portion 62*b* of the bracket 62, or both the first and second portions 62*a*, 62*b* of the bracket 62 have a coating or layer to aid the assembly in moving over the length of the vehicle 14 and to protect the vehicle 14 from damage. In one embodiment, the coating or layer comprises a material such as TEFLON™.

The blade assembly 22 is coupled to the beam 20 and, in some embodiments, the blade assembly 22 is coupled to the guide rail assembly 24. In some embodiments, the blade assembly 22 is configured to operate at a fixed angle relative to the beam 20. In other embodiments, the blade assembly 22 is configurable to operate at different angles relative to the beam 20. Thus, as the assembly 10 is moved over a top surface of a vehicle 14, the angle of the blade assembly 22 ensures that materials are moved from the top of the vehicle 14 off to a side of the vehicle 14. Thus, the build-up of such materials in front of or behind the vehicle 14, which may impair the travel of other vehicles (such as vehicles on the road or in line behind the vehicle being cleared) and which may require immediate removal, is reduced or eliminated.

FIGS. 1 to 4 illustrate a sample blade assembly 22 according to one embodiment of the present invention. In one embodiment, the blade assembly 22 includes a bracket 70 which supports one or more blades 72. The blade 72 may include a flexible material such as rubber on one or both lengthwise edges of the blade 72 to aid in clearing material from the top or roof of the vehicle 14 without damaging the vehicle 14. In one embodiment, the flexible material comprises rubber such as a 1" thick rubber edge. In one embodiment (not shown), the blade assembly 22 includes one or more wear pads mounted to at least one outer surface of the bracket 70. A wear pad may be provided at a first end 74 of the blade 72, opposite the beam 20, for engaging a far side rail of the vehicle 14 being cleared. The wear pad may comprise a material such as TEFLON™. As shown in FIG. 1, a second end 76 of the blade 72 may rest within and slide along a portion of the guide rail assembly 24.

Figure 2:
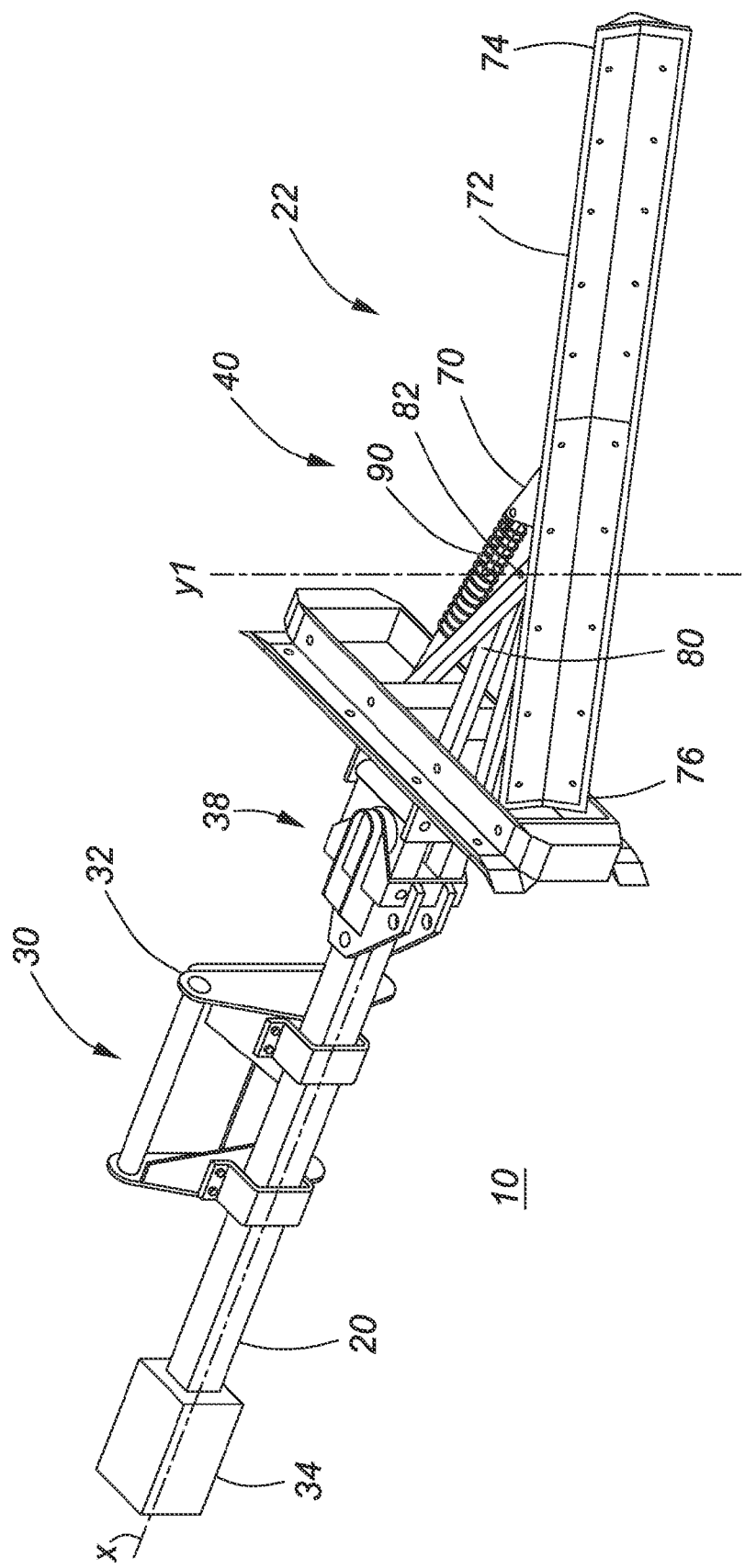
FIG. 2 is a front perspective view of a materials removal assembly in a second position according to one embodiment of the present disclosure.

In one embodiment, the blade assembly 22 is rotatably coupled to the beam 20 through the second coupling 40, which is connected to the beam 20 through the first coupling 38. The second coupling 40 is configured to allow the blade assembly 22 to rotate about a vertical axis transverse to the longitudinal axis of the beam 20. This is illustrated for reference as axis y1 in FIG. 2. In one embodiment, the second coupling comprises one or more support arms 80 provided between the blade assembly 22 and the first coupling 38 to support the weight of the blade 72. In one embodiment, rotation of the blade assembly 22 is achieved by a pin 82 attaching the support arms 80 at a fixed position on the blade 72 as shown in FIG. 2. In use, as the assembly 10 moves over the length of the vehicle 14, the resistance of the material on the top of the vehicle causes a first end 74 of the blade 72 to rotate back or counterclockwise around the axis defined by the pin 82 and the second end 76 to rotate forward. In one embodiment, rotation of the blade 72 is limited to a specific, configurable angle in order to move material off of the side of the vehicle 14 as the assembly 10 travels the length of the vehicle. In some embodiments, the blade 72 is rotated to an angle of between 30 and 55 degrees relative to the resting position of the blade 72. In some embodiments, the blade 72 is rotated to an angle of 30 or 35 degrees. By varying the position of the attachment of the support arms 80 and the pin 82 along the length of the blade 72, different angles of the blade 72 may be achieved during use of the assembly 10. In one embodiment, as illustrated, the support aims 80 are attached to the blade 72 at a position offset from a longitudinal center of the blade 72, closer to the second end 76 of the blade 72. In some embodiments, rotation of the blade 72 and the angle of rotation is stopped or determined by a bumper on a second end of the blade 76 which may be configured to engage the guide rail assembly 24 when the desired degree of rotation is reached.

In some embodiments, the second coupling 40 includes biasing means 90. The biasing means 90 may be connected between the blade assembly bracket 70 and the support arms 80, the guide rail assembly 24, or the first coupling 38. The biasing means 90 may comprise a strut or a spring such as a return spring. The biasing means 90 operates to bias the blade 72 to a first, at rest position when the assembly 10 is not in use. The biasing means 90 also may operate to resist and/or limit rotation of the blade 72 when the assembly 10 is in use. The position and strength of the bias means 90 also may be varied to configure the range of rotation of the blade assembly 22 and the blade 72.

FIGS. 3 and 4 illustrate a materials removal assembly 10 according to one embodiment of the present disclosure in operation. An operator vehicle 12, such as a telehandler shown in the figures, engages the assembly 10 through the operator coupling 30. The assembly 10 may be lifted by the operator vehicle 12 and moved to a position over the front and top of the vehicle 14, or over a surface of a vehicle to be cleared. In one embodiment, such as with the blade assembly 22 described above, when the materials removal assembly 10 is raised, the first end 74 of the blade 72 hangs downward slightly from the beam 20 due to the weight of the blade and the attachment point of the support arms. The assembly 10 also may be configured to tilt slightly forward or towards the vehicle 14 in FIGS. 3 and 4 when raised.

In one embodiment, as the materials removal assembly 10 is lowered onto the top of the vehicle 14, self-aligning features enable the assembly 10 to come into contact with and rest upon the top of the vehicle 14 without damaging the top of the vehicle 14. Specifically, as the assembly 10 is lowered, the first end 74 of the blade 72 device comes into contact with the top side of the vehicle 14, on the side of the vehicle opposite the operator vehicle 12. In one embodiment, the first end 74 of the blade 72 contacts a first guide rail of a trailer as the assembly 10 is lowered. As the assembly 10 is lowered further, the second end 76 of the blade 72 engages a second guide rail of the trailer adjacent the operator vehicle 12. Thus, an operator can ensure safe contact and proper positioning of the materials removal assembly 10 on the far or opposite side of the vehicle without direct visual feedback of this position. Since the top of vehicle 14 such as a transport vehicle may be thin and/or light to reduce the weight of the vehicle, the materials removal assembly 10 can be positioned safely by engaging first and second side rails of the vehicle 14, in order to avoid damaging the top of the vehicle 14. Where the assembly 10 includes a guide rail assembly 24, the guide rail assembly 24 may engage the second guide rail of the trailer adjacent the operator vehicle 12 as the assembly 10 is lowered further. The guide rail assembly 24 also may be angled or tilted forward slightly relative to the beam 20 such that a front edge of the guide rail assembly 24 first engages the second guide rail of the vehicle 14. As the materials removal assembly 10 is lowered further, the remaining portion of the guide rail assembly 24 then engages the first guide rail.

As shown in FIG. 4 and discussed above, the first coupling 38 between the beam 20 and the blade assembly 22 allows the blade assembly 22 and the guide rail assembly 24, when used, to rest on the top of and level with the top of the vehicle 14. A layer or coating between the guide rail assembly 24 and the vehicle 14 assists with movement of the guide rail assembly 24 over the vehicle 14 and prevents damage to the vehicle 14. In one embodiment, the suspension system 50 ensures that an even load is provided across the top of the vehicle 14 but that the full load of the materials removal assembly 10 is not placed on the top of the vehicle 14. As shown in FIG. 4, in one embodiment, the arms 42 of the first coupling 38 are biased upwards to reduce the load of the assembly 10 on the top of the vehicle 14.

Once the materials removal assembly 10 is positioned on top of the vehicle surface to be cleared, the operator vehicle 12 travels down the length along one side of the vehicle 14. In one embodiment, movement of the materials removal assembly 10 and the resistance of the snow or other material on the top of the vehicle 14 causes rotation of the blade 72 and blade assembly 22 as described above. The blade 72 remains relatively at this angle as the assembly is moved down the length of the trailer. As described above, in one embodiment, a bumper on the second end 76 of the blade 72 may be provided to engage a front arm of the guide rail assembly 24 to prevent further rotation of the blade 72 during use. As the operator vehicle 12 travels down the length along one side of the vehicle 14, such as the "driver's side" of the vehicle as shown in FIG. 4, the snow or materials are moved by the assembly 10 to fall off of the opposite side of the vehicle 14, such as the "passenger side" of the vehicle in FIG. 4.

As well, as the operator vehicle 12 travels down the length along one side of the vehicle 14, the load indicator 56 provides feedback to the operator. If the load decreases significantly or beyond a first threshold, such as where the vehicle is parked downhill relative to the initial position of the operator vehicle 12, the assembly 10 may be lowered to ensure proper contact is made by the blade 72 with the top of the vehicle 14 for removing snow or other materials. Similarly, if the load increases significantly or beyond a second threshold, such as where the vehicle 14 is parked uphill relative to the initial position of the operator vehicle 12, the assembly 10 may be raised to ensure proper contact is made with the top of the vehicle 14 for removing snow or other materials. Thus, the assembly 10 may be raised to prevent an excessive load on the top of the vehicle 14. The terms "uphill" and "downhill" are used herein for illustrative purposes only and it will be appreciated that an upward or downward adjustment of the assembly 10 may be required for slight variations in terrain on which the vehicle 14 and/or operator vehicle 12 are situated.

Once the top of the vehicle 14 is cleared, the materials removal assembly 10 is lifted off of the vehicle 14. The assembly 10 and operator vehicle 12 may move to clear a second vehicle. Alternatively, the materials removal assembly 10 may be lowered to the ground and the operator vehicle 12 may disconnect from the assembly 10. The operator vehicle 12 may then connect to other equipment, such as a traditional snow pusher blade to clear the snow from one or more areas around the vehicle. Thus, it will be appreciated that the use of a materials removal assembly 10 according to the present disclosure may be interchanged with the use of a snow pusher blade while the operator remains in the cab of the vehicle.

In some embodiments, the materials removal assembly and method disclosed herein may be adapted for a fleet of vehicles or a transport company operating at a 3:1 ratio of truck. It will be appreciated that a number of combinations of the beam 20, blade assembly 22, first coupling 38, second coupling 40, suspension system 50 and load indicators 56 may be provided and configured to operate from one or both sides of a vehicle 14.

FIGS. 7 to 18 illustrate further embodiments of a materials removal assembly 110 according to the present disclosure. The materials removal assembly 110 includes a beam 120 which, in one embodiment, is coupled to a blade assembly 122. The blade assembly 122 is configured at an angle or may be rotated to an angle such that, as the assembly 110 is moved along a length of the vehicle 14, materials on top of the vehicle, such as snow, are pushed by the blade assembly 122 to a side of the vehicle 14 opposite the operator vehicle 12. In this configuration, the assembly 110 is provided for use on one side of the vehicle 14. In other embodiments, the materials removal assembly 110 comprises the beam 120 coupled to an auger assembly.

Figure 7:
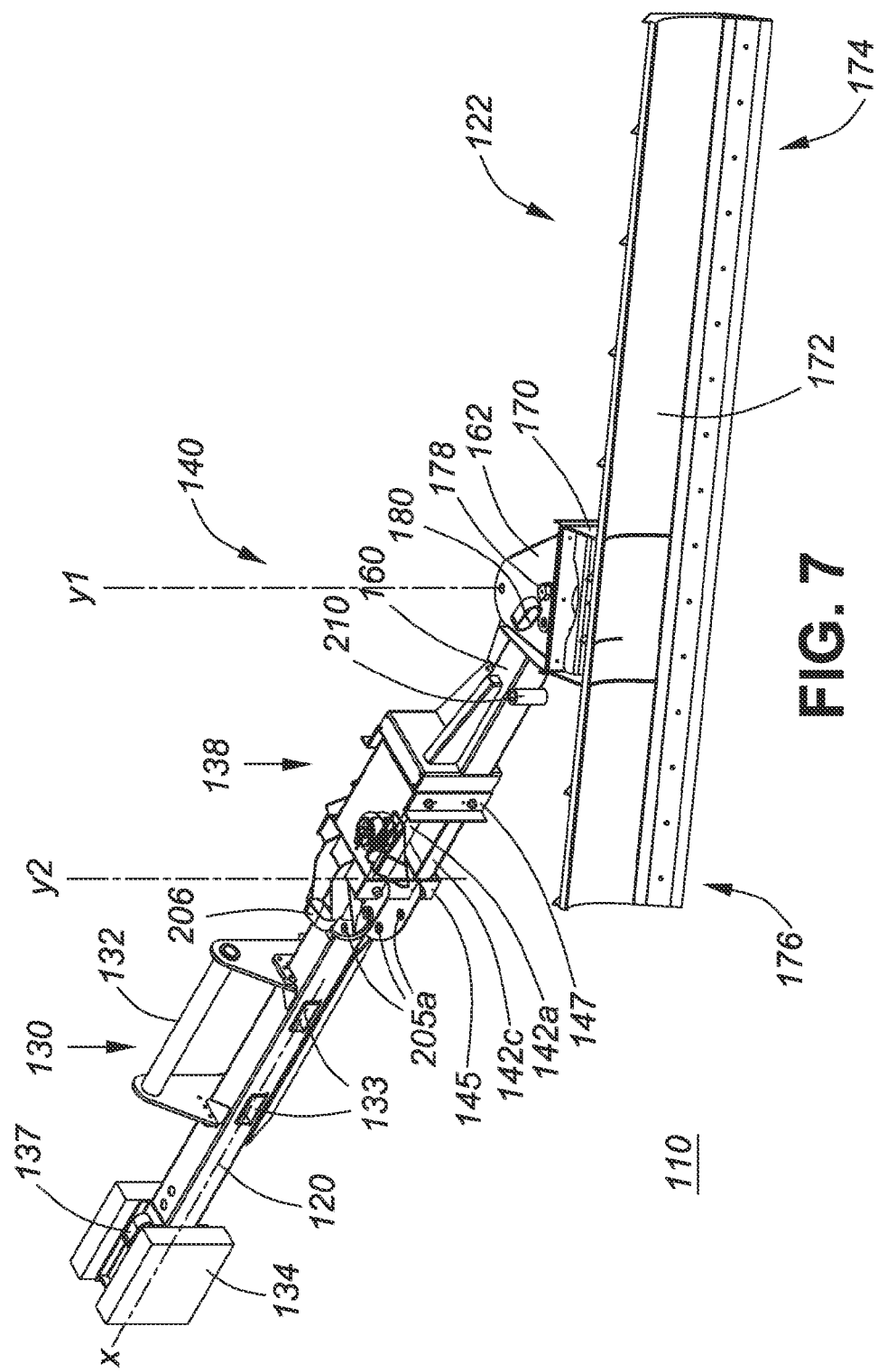
FIG. 7 is a perspective view of a materials removal assembly according to one embodiment of the present disclosure in a position for a first operation.

The beam 120 includes an operator coupling 130 which allows an operator vehicle 12, to engage, lift and operate the assembly. In one embodiment, a telehandler bracket 132 is fixed to the beam 20 such as by welding. Alternatively, the bracket 132 may be bolted to the beam 120 as shown in FIG. 7, to allow for quicker connection to and disconnection from the beam 120. In another embodiment, the beam 120 defines pockets 133 for use of the device with an operator vehicle 12 such as a fork truck. In another embodiment, an extension is provided (not shown) for the operator coupling 130 to extend to a wheel loader so that the assembly 110 may be raised above and over a vehicle using the wheel loader.

Figure 11:
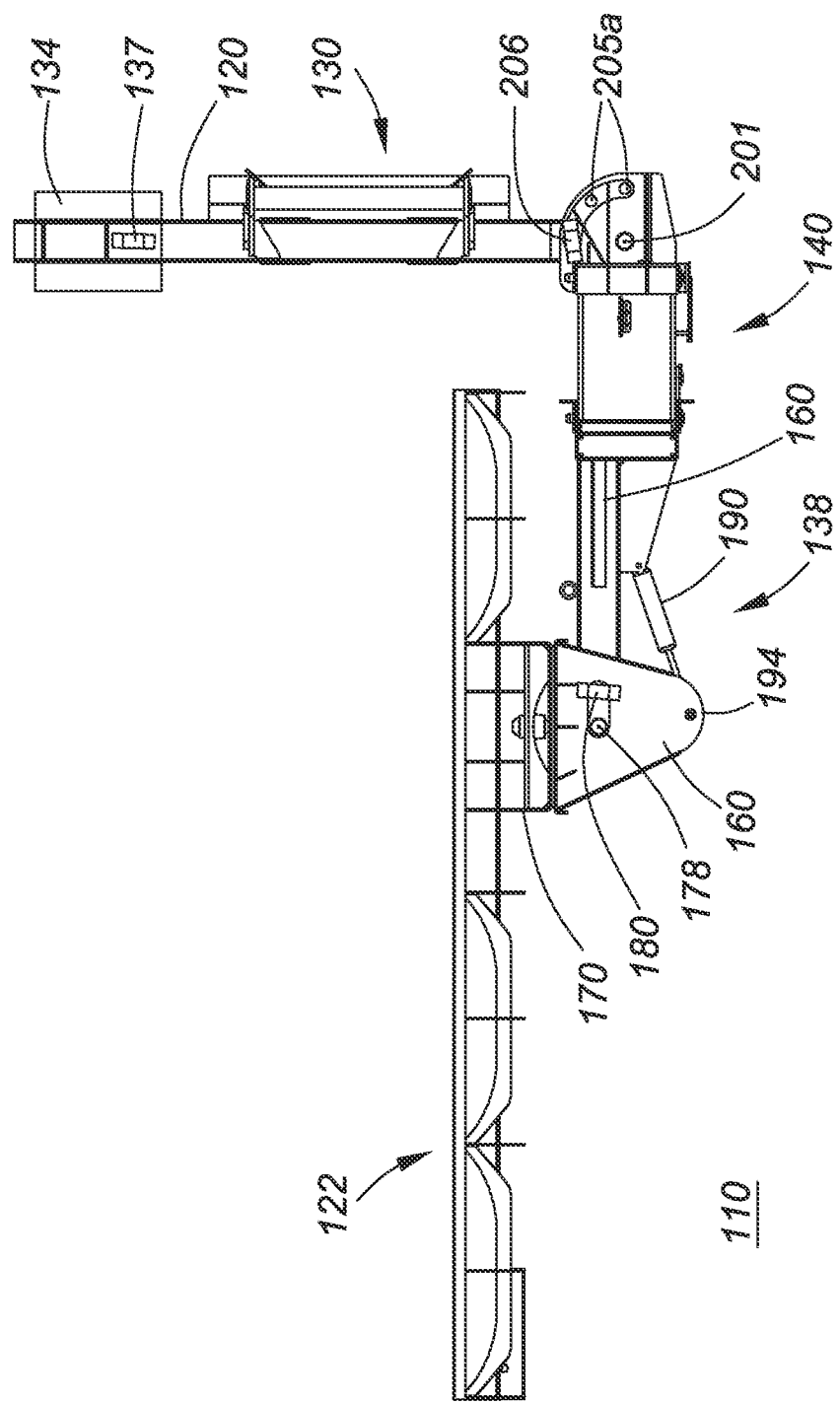
FIG. 11 is a top view of a materials removal assembly according to one embodiment of the present disclosure in a position for storage or transfer.

In one embodiment, the assembly 110 includes a counterweight 134 coupled to a second end of the beam 120 to offset the weight of the blade assembly 122 or auger assembly. In a further embodiment, as illustrated in FIG. 7, the counterweight 134 is configured to slidably engage the beam 120. The counterweight 134 may be moved or slid along the beam 120 and locked at predetermined positions on the beam 120 so as to offset the blade assembly 122 or auger assembly. Locking of the counterweight 134 at a predetermined position on the beam 120 also may be used to reduce the size of the assembly 110 for storage or transport as illustrated in FIG. 11. In one embodiment, locking of the counterweight 134 may be achieved by aligning one or more apertures 135a in the counterweight 134 with one or more apertures 135b in the beam 120 and inserting one or more bolts or locking pins 137 in the aligned apertures to secure the counterweight 134.

In one embodiment, the beam 120 and the blade assembly 122 are connected by a first coupling 138 and a second coupling 140. As described above, the first coupling 138 is configured to permit rotation or pivoting of the second coupling 140 and the blade assembly 122 above and/or below a longitudinal axis of the beam 120, shown for illustration purposes as an x-axis in FIG. 7. The second coupling 140 is configured to allow the blade assembly 122 to rotate about a vertical axis transverse to the longitudinal axis of the beam 120. This is illustrated for reference as axis y1 in FIGS. 7, 8 and 17.

Figure 16:
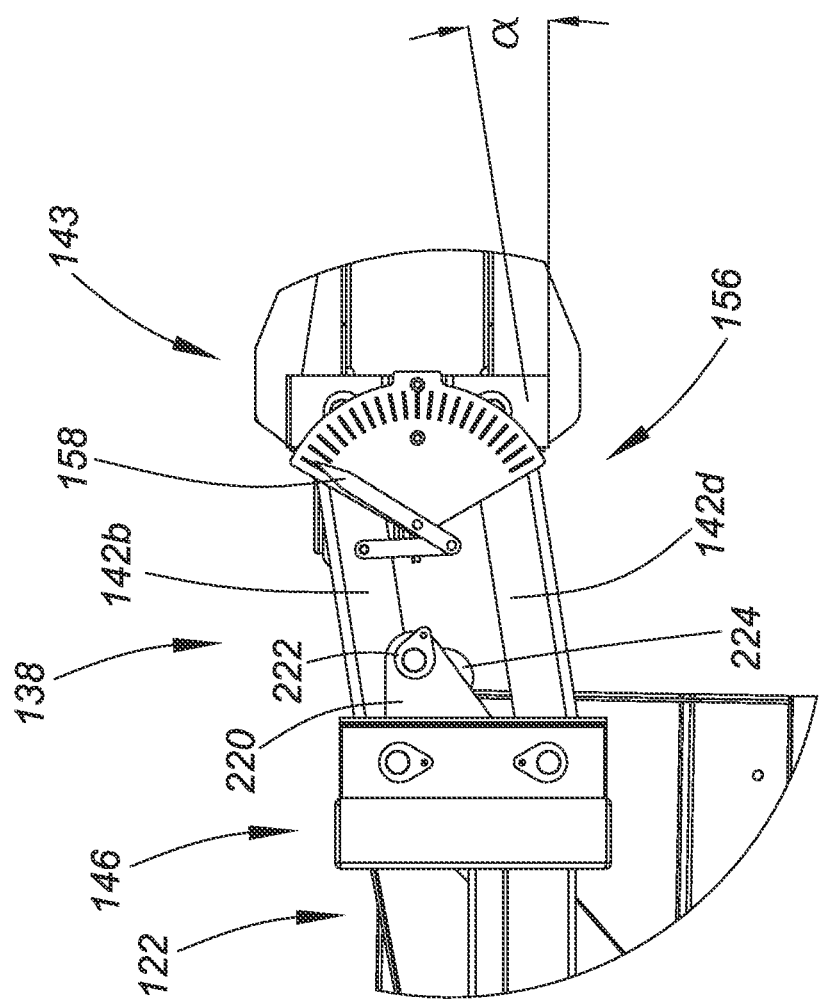
FIG. 16 is an enlarged view of a materials removal assembly and the circled portion of FIG. 15.

In one embodiment, the first coupling 138 comprises multiple arms 142 connecting the beam 120 and the blade assembly 122 through the second coupling 140. As described above, the first coupling 138 provides a gimble effect so that the beam 120 may be fixedly engaged by the operator vehicle 12 and the blade assembly 122 may be substantially parallel to the top surface of the vehicle 14. In one embodiment, the first coupling 138 comprises four arms 142a, 142b, 142c, 142d which are rotatably configured between the beam 120 and the second coupling 140 in order to support the weight of the blade assembly 122 and permit rotation of the blade assembly 122 relative to the beam 120. In one embodiment, as can be seen from FIG. 17, the upper arms 142a, 142b, may be joined or reinforced by a horizontal plate or additional cross braces and the lower arms 142c, 142d also may be joined reinforced by a horizontal plate or additional cross braces. It will be appreciated that the pairs of arms 142 may be molded as one piece or otherwise welded or assembled. In one embodiment, the second coupling 140 may move +/−10 to 12 inches relative to the beam 120. As illustrated in FIG. 16, the angle of rotation a of the second coupling 140 and blade assembly 122 relative to the beam 120 may be +/−9 degrees. The first coupling 138 and arms 142 may be configured and dimensioned to configure the amount of rotation of the second coupling 140 and blade assembly 122.

Figure 17:
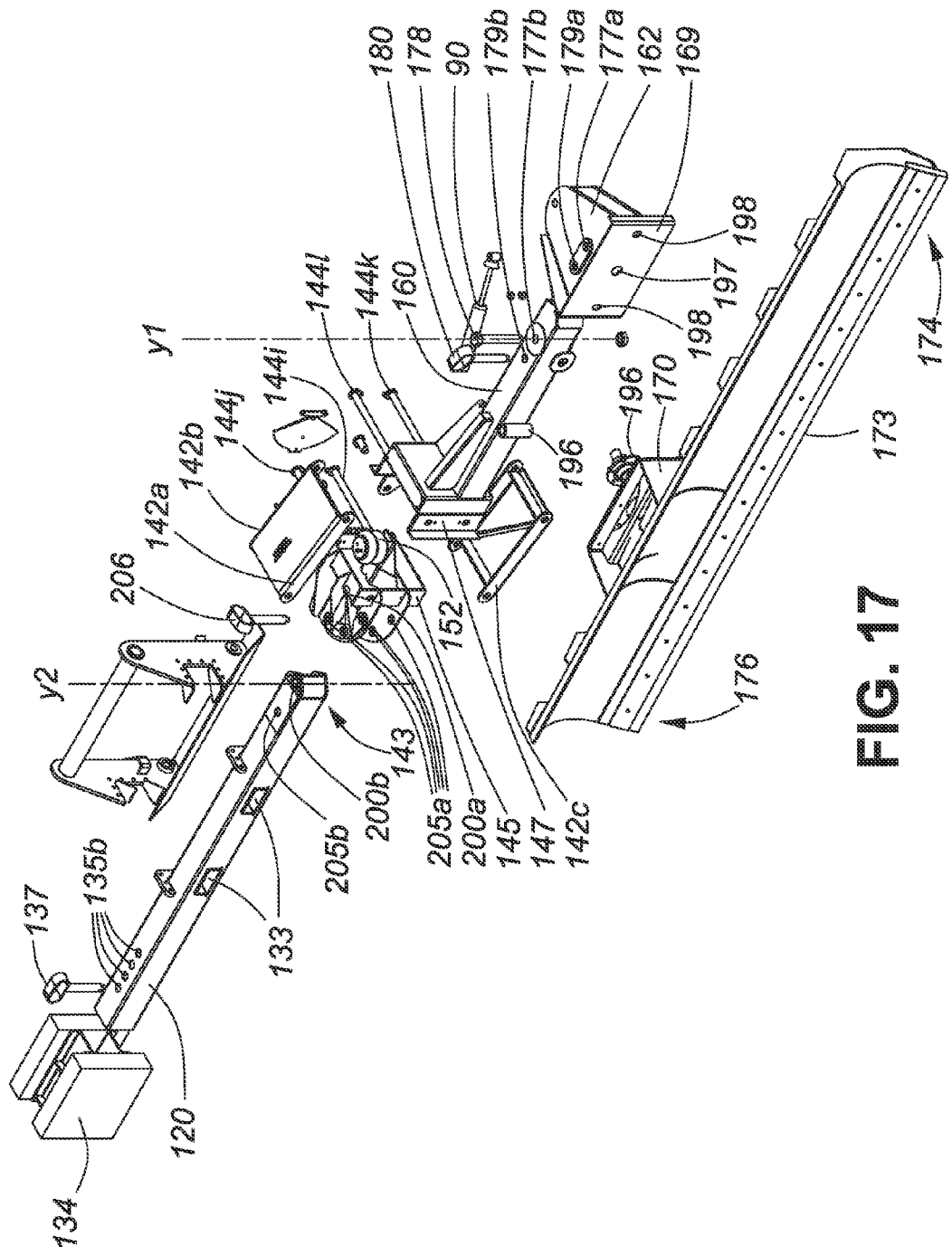
FIG. 17 is an exploded view of a materials removal assembly according to one embodiment of the present disclosure.

As can be seen from FIG. 17, the arms 142 may be rotatably coupled to a first end 143 of the beam 120, such as by the use of a bolt or pin 144i coupling the arms 142c and 142d to a lower portion of a frame, plate or bracket 145 at the first end 143 of the beam 120 and the use of a bolt or pin 144j coupling the arms 142a and 142b to an upper portion of the frame, plate or bracket 145. The arms 142 may be rotatably coupled to a first end 146 of the second coupling 140, such as by the use of a bolt or pin 144k coupling the arms 142c and 142d to a lower portion of a frame, plate or bracket 147 at the first end 146 of the second coupling 140, and the use of a bolt or pin 144l coupling the arms 142a and 142b to an upper portion of the frame, plate or bracket 147.

In some embodiments, the assembly 110 includes a suspension system 150 as shown, for example, in the views of FIGS. 7 and 17. The suspension system 150 operates so that a portion of the load of the blade assembly 122 is supported by the beam 120 when the assembly 110 is in use in order to reduce the load on the top of the vehicle 14 which is being cleared of materials. In one embodiment, the suspension system 150 comprises suspension means 152 such as an airbag device. In one embodiment, the suspension system 150 is provided within the arms 142 of the first coupling 138 to exert an upward force on the upper arms 142a, 142b of the first coupling 138 and to deflect the load from the top of the vehicle.

In some embodiments, the first coupling 138 includes a load sensing system and a load indicator 156, as described above, to provide feedback to an operator of the load being applied to the top of the vehicle. The load indicator 156 may be configured to provide visual feedback of a range of acceptable loads on the vehicle. In one embodiment, the load indicator comprises an arm or pointer 158 which moves relative to the load, as shown, for example, in FIGS. 9 and 16. The load indicator 156 may be provided at the rear of the assembly 110, as shown, in order to be visible to a driver of the operator vehicle 12 when the assembly is in use.

In one embodiment, the blade assembly 122 is coupled to the first coupling 138 and the beam 120 through the second coupling 140. The second coupling 140 is configured to allow the blade assembly 122 to rotate about a vertical axis transverse to the longitudinal axis of the beam 120. This is illustrated for reference as axis y1 in FIGS. 7 and 8. In one embodiment, the second coupling 140 comprises a member 160 and a housing 162. A first end 166 of the member 160 may be configured with the frame, plate or bracket 147, as described above, for connecting to the first coupling 138. A second end 168 of the member 160 may be configured for supporting and rotatably engaging the housing 162.

In one embodiment, the housing 162 includes a first side 169 which is adapted to receive and support a bracket 170 of the blade assembly 122, as described further below. The bracket 170 supports one or more blades 172 which are configured for removing different types of materials from a horizontal surface of a vehicle 14. In some embodiments, the blade 172 may include a flexible material such as rubber on a bottom lengthwise edge 173 of the blade 172. In one embodiment, the flexible material comprises rubber such as a 1" or 1.5" thick rubber edge. In operation, the flexible material at the edge 173 of the blade 172 permits some deflection in the blade 172 as it travels over a surface of the vehicle 14, which may assist with breaking up or loosening materials such as ice or snow on the surface of the vehicle 14. In one embodiment, the housing 162 is rotatably mounted over a portion of the second end 168 of the member 160. A first aperture 177a may be defined in the housing 162 and aligned with a first aperture 177b in the second end 168 of the member 160. A first pin or bolt 178 may be used to secure the housing 162 to the member 160 through the first apertures 177a, 177b. As shown, the housing 162 and blade assembly 122 are thus able to pivot or rotate about the y1 axis of the pin or bolt 178.

The second coupling 140 may include additional features to prevent the blade assembly 122 from rotating. In one embodiment, a second aperture 179a is defined in the housing 162 adjacent the first aperture 178a, and a second aperture 179b is defined in the second end of the member 160 adjacent the first aperture 178b. The housing 162 may be rotated to align the second apertures 179a, 179b. When a second bolt or locking pin 180 or other means for securing the two parts is inserted in the apertures 179a, 179b, the housing 162 is prevented from rotating about axis y1. As described below, this position of the housing 162 and blade assembly 122 may be used for transport, storage or other operations. For example, the housing 162 may be secured in this position and prevented from rotating when the assembly 110 is provided with an auger assembly, instead of the blade assembly 122.

In some embodiments, the second coupling 140 includes biasing means 190. The biasing means 190 may be connected between the member 160 and the housing 162. In one embodiment, the biasing means 190 is connected between the member 160 and a position adjacent a second edge or side 194 of the housing 162, opposite the first side 169 of the housing 162. In one embodiment, the biasing means 190 is pivotably or rotatably coupled to the housing 162. The biasing means 190 may comprise a strut or a spring such as a return spring. The biasing means 190 operates to bias the blade assembly 122 and blade 172 to a first, at rest position when the assembly 110 is not in use as illustrated in FIGS. 11 and 17. The biasing means 190 also may operate to resist and/or limit rotation of the blade 172 when the assembly 110 is in use.

Figure 8:
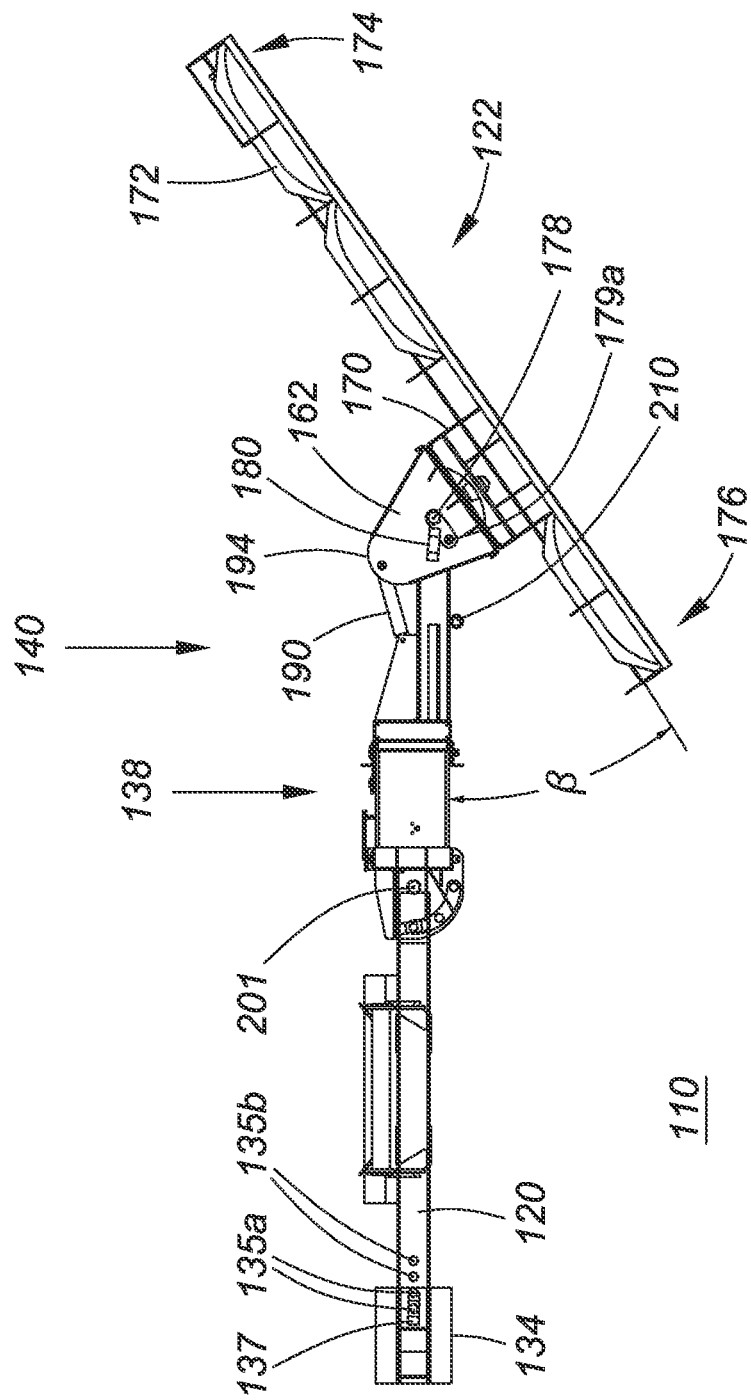
FIG. 8 is a top view of a materials removal assembly according to one embodiment of the present disclosure in a position for a first operation.
Figure 9:
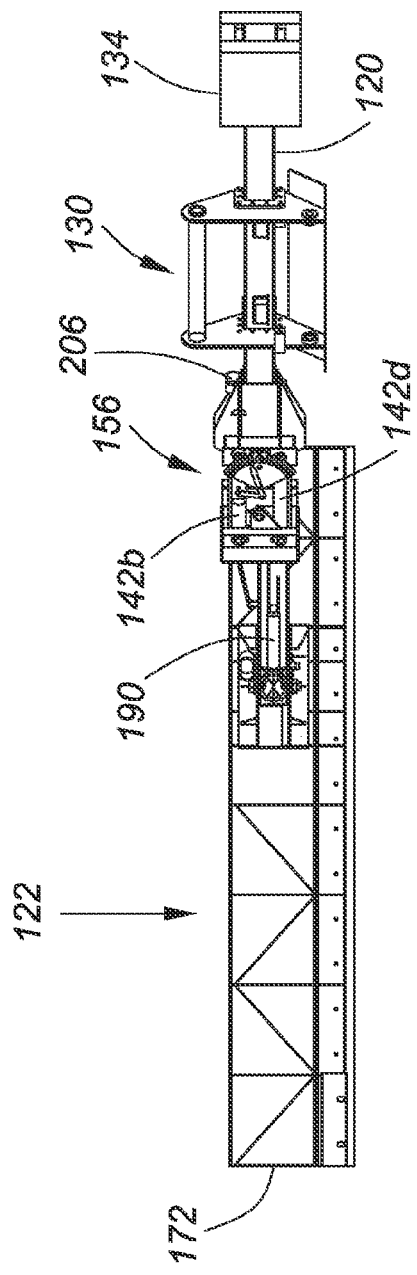
FIG. 9 is a rear view of a materials removal assembly according to one embodiment of the present disclosure in a position for a first operation.
Figure 18:
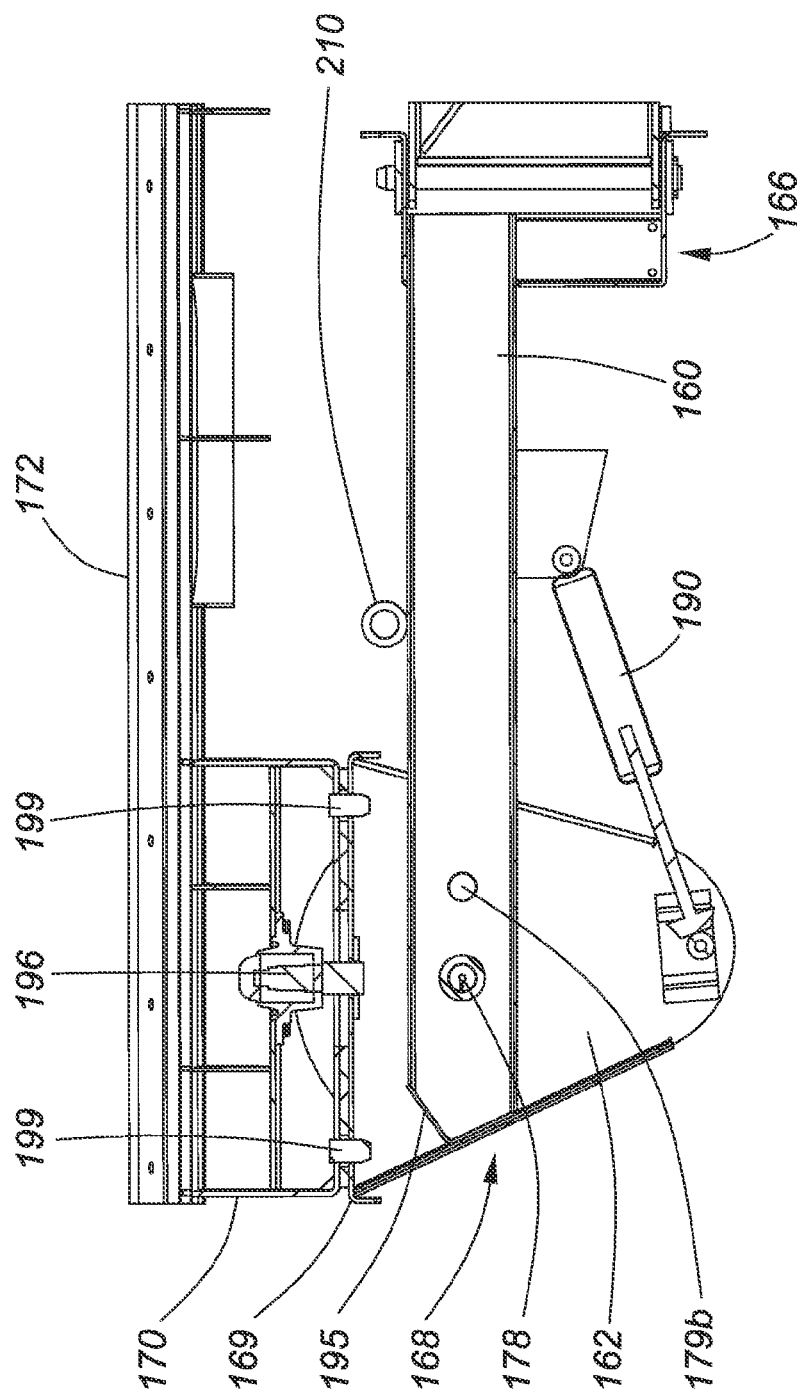
FIG. 18 is an enlarged top view of a section of the materials removal assembly at line A-A' of FIG. 12.

As described above, in use, as the assembly 110 moves over the length of the vehicle 14, the resistance of the material on the top of the vehicle 14 causes a first end 174 of the blade 172 to rotate back or counterclockwise around the y1 axis, and a second end 176 of the blade 172 to rotate forward. As a result, materials removed using the assembly 110 may be moved primarily off to one side of the vehicle 14. In some embodiments, the blade 172 is permitted to rotate to an angle β of 30 or 35 degrees relative to a longitudinal axis of the member 160, as illustrated in FIG. 8. By varying the position of the attachment of the bracket 170 and housing 162 to the blades 172, along the length of the blade 172, different angles of the blade 172 may be achieved during use of the assembly 110. In one embodiment, the bracket 170 and housing 162 are attached to the blade 172 at a position offset from a longitudinal center of the blade 172, closer to the second end 176 of the blade 172. In one embodiment, the bracket 170 and housing 162 are attached to the blade 172 at a position 48" from the second end 176 of a 144" long blade 172. In some embodiments, the rotation of the housing 162 and blade assembly 122 may be stopped by the first side 169 of the housing 162 coming into contact with and abutting an angled portion 195 of the second end 168 of the member 160, as illustrated in FIG. 18. It will be appreciated that the rotation of the blade 172 also may be limited or stopped through other mechanisms, including but not limited to, the use of a guide rail assembly, as described above. The position, size and strength of the bias means 190 also may be varied to configure the range of rotation of the blade assembly 122 and the blade 172.

In one embodiment, the blade 172 and bracket 170 are rotatably coupled to the housing 162 such as with the use of a hub and axle assembly. As illustrated by the arrows in FIG. 10, this allows the blade 172 to rotate or tilt slightly, such as by +/−1 degree during use to assist with alignment of the blade 172 with the surface being cleared. The bracket 170 may be rotatably mounted to the housing 162 such as with the use of a stub axle 196 as illustrated in FIG. 17 mating with a corresponding connection 197 on the first side 169 of the housing 162. In one embodiment, elongated apertures 198 are provided on the first side 169 of the housing 162. The apertures 198 align with corresponding pins 199 or connections on the bracket 170 (as seen in FIG. 18) to limit the pivot or rotation of the blade 172 to a few degrees. It will be appreciated that the amount of pivot or rotation of the blade 172 may be varied and controlled with the size, placement and shape of the apertures 198. The amount of pivot or rotation of the blade 172 also may be limited or controlled through other means. The blade 172 is thus permitted to rotate about an axis of the stub axle, transverse to the vertical plane of the first side of the housing. One or more nylon spacers or washers (not shown) may be provided adjacent the stub axle 196 to enable rotation of the bracket 170 relative to the housing 162.

Figure 12:
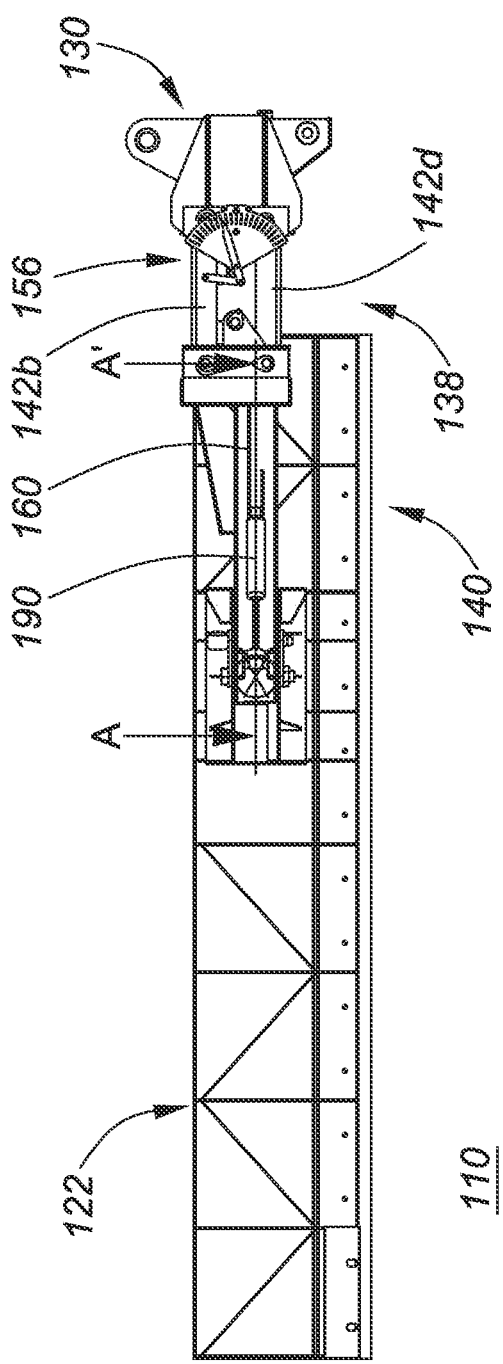
FIG. 12 is a rear view of a materials removal assembly according to one embodiment of the present disclosure in a position for storage or transfer.
Figure 13:
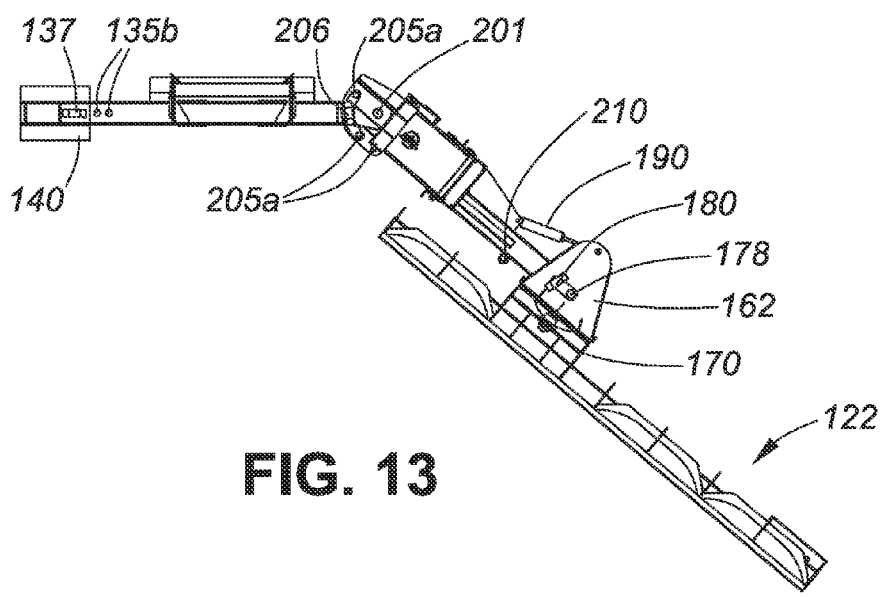
FIG. 13 is a top view of a materials removal assembly according to one embodiment of the present disclosure in a position for a second operation.
Figure 14:
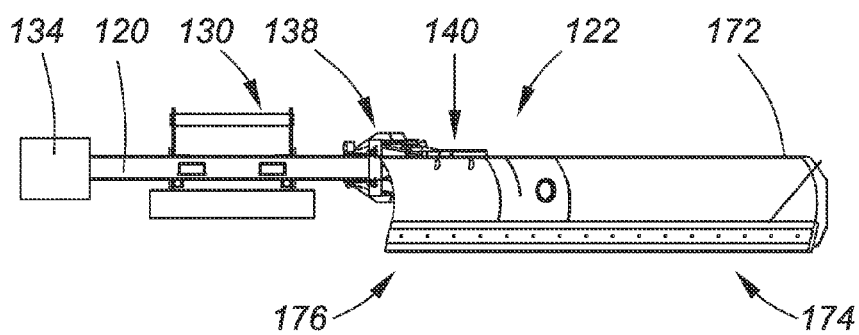
FIG. 14 is a front view of a materials removal assembly according to one embodiment of the present disclosure in a position for a second operation.
Figure 15:
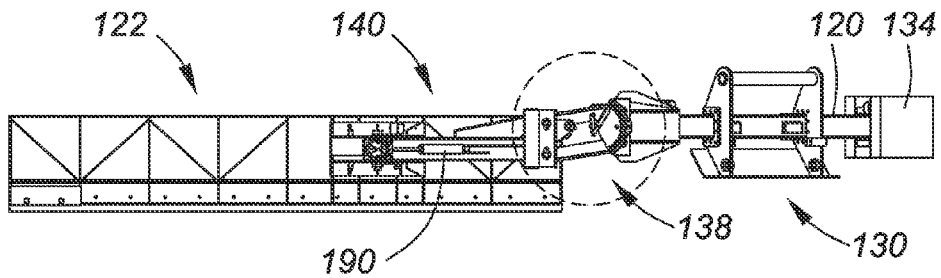
FIG. 15 is a rear view of a materials removal assembly according to one embodiment of the present disclosure in a position for a second operation.

FIGS. 7 to 10 illustrate an embodiment of the materials removal assembly 110 configured in a position for use to remove material from a horizontal surface of a vehicle 14 as described above. The assembly 110 also may be configured in different positions for other operations or uses. FIGS. 11 and 12 illustrate the assembly 110 configured in a different position for transport or storage. FIGS. 13 to 15 illustrate the assembly 110 configured in a different position for use in clearing materials from underneath a vehicle 14.

In order for the assembly 110 to be configured or folded for transport, the beam 120 may include a hinge (not shown) which allows the beam 120 to be moved to a more compact position. In one embodiment, the first coupling 138 is rotatably connected to the first end 143 of the beam 120 to allow the first coupling 138 to rotate about a vertical axis transverse to the longitudinal axis of the beam 120. This is illustrated for reference as axis y2 in FIGS. 7, 8 and 17. A first aperture 200a may be defined in the first coupling 138 and aligned with a first aperture 200b in the first end 143 of the member beam 120. A first pin or bolt 201 may be used to secure the first coupling 138 to the beam 120 through the first apertures 200a, 200b. In one embodiment, the first coupling 138 is configured to rotate up to 90 degrees relative to the beam 120. The first coupling 138 may be held in this rotated position by various means, such as straps, chains or wires (not shown).

In some embodiments, one or more additional apertures, such as a series of apertures 205a are defined in the first coupling 138 and a second aperture 205b is defined in the beam 120. In one embodiment, as illustrated in FIG. 17, the first coupling 138 may include one or more plates with a series of apertures 205a defined in each plate. As the first coupling 138 is rotated about the bolt 201 and axis y2, one of the series of apertures 205a in the first coupling may be aligned with the second aperture 205b in the beam 120. A second bolt or locking pin 206 or other means for securing the two parts may be inserted in the apertures 205a, 205b. Thus, the first coupling 138 may be secured at a fixed angle relative to the beam 120.

During use of the assembly 110 for clearing materials from a horizontal surface of a vehicle 14, the first coupling 138 may be secured by pin 206 at an angle 180 degrees with respect to the beam 120 as illustrated in FIG. 8. In order to make the assembly 110 smaller for storage and transport, in some embodiments, the series of apertures 205a may be configured to secure the first coupling 138 at an angle of 90 degrees with respect to the beam 120, as illustrated in FIGS. 11 and 12. As described above, for storage or transport, the counterweight 134 also may be moved and secured at a predetermined position on the beam 120, closer to the operator coupling 130, in order to reduce the size of the assembly 110. Additionally, the housing 162 and blade assembly 122 may be secured at a fixed position by the alignment of apertures 179a, 179b and use of locking pin 180, as described above, to prevent rotation of the blade assembly during transport or storage.

FIGS. 13 to 16 illustrate a further position and configuration of the materials removal assembly 110 which may be used for clearing materials from the ground or a surface around and underneath a vehicle 14. In this position, the first coupling 138 is rotated and secured at an angle of about 140 degrees relative to the beam 120 by the alignment of one of a series of apertures 205a with a second aperture 205b on the beam 120. The first coupling 138 is locked in this position with locking pin 206. As well, in order to prevent rotation of the housing 162 and blade assembly 122, the second aperture 179a in the housing 162 is aligned with the second aperture 179b in the member 160 and secured with locking pin 180. As illustrated, one or more holders 210 may be provided in the assembly 110 for holding or securing the locking pins 180, 206 when these are not being used.

Figure 10:
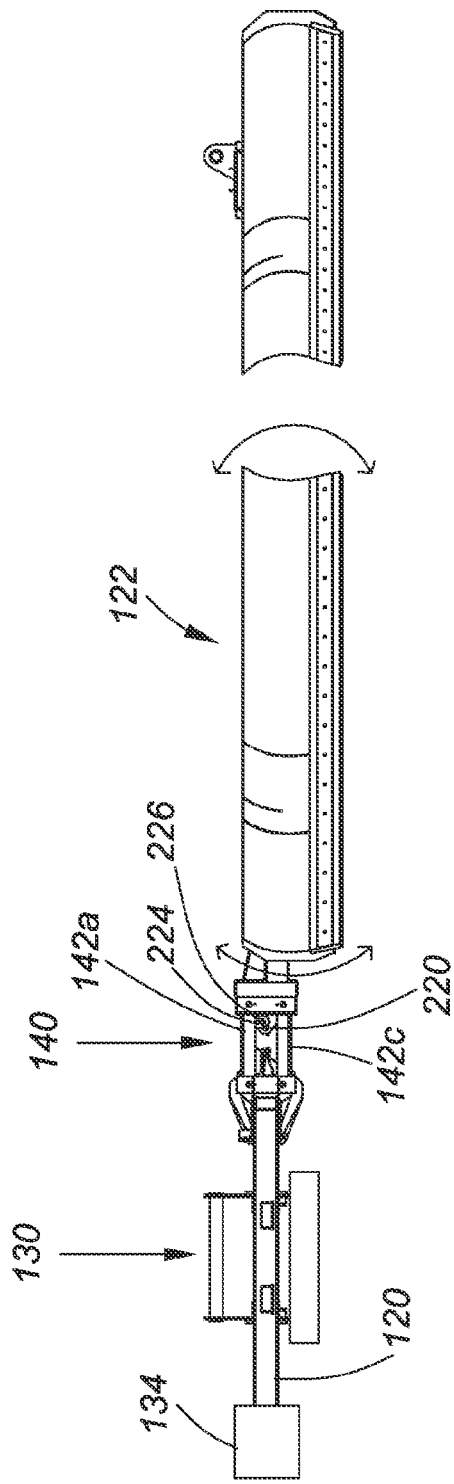
FIG. 10 is a front view of a materials removal assembly according to one embodiment of the present disclosure in a position for a first operation.

Additionally, when the assembly 110 is used for clearing materials from the ground or a surface around and underneath a vehicle 14, the first coupling 138 may be locked at a predetermined angle relative to the longitudinal, x-axis of the beam 120 as illustrated in FIGS. 15 and 16. Locking of the first coupling 138 ensures that a vertical separation is maintained between the blade assembly 122 and the beam 120 in order to provide clearance above the ground for the operator coupling 130. In one embodiment, the first coupling 138 may be locked with the arms 142 at an angle of about 9 degrees. Locking of the first coupling 138 also counters the operation of the suspension system 150 and allows pressure to be applied to the blade 172 and the ground or surface being cleared. In one embodiment as illustrated in FIGS. 10 and 16, a plate 220 is provided on the first end 146 of the second coupling 140, such as on the bracket 147. The plate 220 defines an aperture 222. A second plate is provided on one or more of the arms 142, such as plate 224 shown on arm 142b and defining an aperture 226. When the first coupling 138 is rotated to a predetermined position, where the apertures 222 and 226 are aligned, a bolt or pin 228 may be inserted into position to lock the first coupling 138 in place. The configuration, size and placement of the plate 220 and aperture 223 may be varied to control the angle and displacement of the blade assembly 122 relative to the beam 120. It will be appreciated that other locking mechanisms may be provided, such as with an aperture through an arm 142 for alignment with the plate 220 and aperture 222.

FIG. 19 illustrates a further embodiment of a materials removal assembly 310 which includes a beam 320 and an auger assembly 322. The assembly 310 is configured for use from one side of a vehicle 14 and includes a guide rail assembly 324 for engaging a guide rail of the vehicle 14 from the one side. The auger assembly 322 includes an auger 325 which is configured to rotate and capture materials from the top of the vehicle 14 for discharging at a first end 327 of the auger assembly 322, opposite the beam 320 and operator vehicle 12. The auger assembly 322 includes a hydraulic motor (not shown) to power the auger 325. While the auger 325 is operated to discharge materials at a first end 327, the auger 325 may be operated in a reverse direction to assist with the breakup of materials, such as ice or snow, on the surface being cleared. In one embodiment, the auger assembly 322 is coupled to the beam 320 through a first coupling 338 and a second coupling (not shown in FIG. 19). The first coupling 338 may be provided as described above for first couplings 38, 138. The second coupling may be provided as described above for the second couplings 40, 140. In one embodiment, using the second coupling 140, the auger 325 may be rotatably coupled to the first side 169 of the housing 162 such as with a stub axle connection 196. This connection, along with apertures 198 on the first side 169 of the housing 162 and corresponding pins on a rear portion of the auger 325, limits the pivot or rotation of the blade 325 to a few degrees to assist with clearing materials from the surface of the vehicle 14 and accommodating an uneven surface or uneven terrain on which the vehicle 14 rests.

In further embodiments, the blade assemblies 22, 122 or auger assembly 322 may be mounted to the support arms 80 or second coupling 140 using one or more self-aligning brackets. The brackets may aligned and then bolted or locked together to affix the two components. In other embodiments, modified guide rail assembly may be provided for operation of the assemblies 10, 110, 310 from only one side of the vehicle 14. In addition to or in place of a guide rail assembly, one or more slider blocks (not shown) may be provided and rotatably coupled to the blade assembly 22, 122 or auger assembly 322 so that the blocks may engage and slide along a top rail of the vehicle while the blade assembly is rotated in use.

Thus, it is apparent that there has been provided in accordance with the embodiments of the present disclosure a materials removal assembly for vehicles which fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A materials removal assembly for clearing materials from a vehicle, the assembly comprising:
    a beam;
    a first coupling connected to a first end of the beam;
    a second coupling connected to the first coupling; and
    a materials removal sub-assembly connected to the second coupling, the materials removal sub-assembly for removing materials from a surface of the vehicle;
    wherein the first coupling is configured to permit rotation of the second coupling and the materials removal sub-assembly above and below a longitudinal axis of the beam; and
    wherein the second coupling is configured to permit pivoting of the materials removal sub-assembly about a first vertical axis transverse to the longitudinal axis of the beam.

2. The materials removal assembly of claim 1 wherein the second coupling comprises a member connected to the first coupling and a housing connected to the materials removal sub-assembly, the housing being pivotably connected to the member.

3. The materials removal assembly of claim 2 wherein the first coupling comprises at least one pair of arms extending between the first end of the beam and the member of the second coupling, a first end of each arm rotatably engaging the first end of the beam and a second end of each arm rotatably engaging a first end of the member.

4. The materials removal assembly of claim 2 wherein the member defines a first aperture and wherein the housing defines a first aperture aligned with the first aperture of the member, the second coupling further comprising a first pin extending through the first apertures of the member and the housing, wherein the housing and the materials removal sub-assembly are pivotable about a vertical axis of the first pin.

5. The materials removal assembly of claim 4 wherein the member defines a second aperture and the housing defines a second aperture and wherein, pivoting of the housing about the first pin to align the second apertures, and insertion of a second pin in the second apertures prevents pivoting of the housing and the materials removal sub-assembly.

6. The materials removal assembly of claim 2 wherein the second coupling comprises biasing means configured to urge the housing and the materials removal sub-assembly to a return position parallel with the longitudinal axis of the beam.

7. The materials removal assembly of claim 2 wherein the materials removal sub-assembly comprises a blade rotatably connected to a first side of the housing, wherein the blade is configured to rotate about an axis transverse to a vertical plane of the first side of the housing.

8. The materials removal assembly of claim 7 wherein the second coupling comprises biasing means extending between the member and the housing, the biasing means configured to urge the materials removal sub-assembly to a return position parallel with the longitudinal axis of the beam.

9. The materials removal assembly of claim 8 wherein the biasing means extends between the member and a position adjacent a second side of the housing, opposite the first side of the housing.

10. The materials removal assembly of claim 7 wherein a second end of the member, opposite the first end of the member and adjacent the first side of the housing comprises a stop configured to engage the housing and prevent pivoting of the blade and the housing beyond a predetermined angle.

11. The materials removal assembly of claim 2 wherein the housing engages the materials removal sub-assembly at a position offset from a center of the materials removal sub-assembly.

12. The materials removal assembly of claim 1 wherein the first coupling is rotatably connected to the first end of the beam, the first coupling being configured to rotate about a second vertical axis transverse to the longitudinal axis of the beam.

13. The materials removal assembly of claim 12 wherein the first coupling is configured to lock at one of a plurality of predetermined angles relative to the beam.

14. The materials removal assembly of claim 12 wherein the beam defines a first aperture adjacent the first end of the beam and wherein the first coupling defines a first aperture aligned with the first aperture of the beam, the first coupling further comprising a first pin extending through the first apertures of the beam and the first coupling, and wherein the second vertical axis transverse to the longitudinal axis of the beam is defined by a vertical axis of the first pin.

15. The materials removal assembly of claim 14 wherein the beam defines a second aperture and the first coupling defines a series of apertures spaced apart from the first aperture of the first coupling, wherein the first coupling is configured to be locked at a predetermined angle relative to the beam by rotation of the first coupling about the first pin to align one of the series of apertures of the first coupling with the second aperture of the beam, and by insertion of a second pin in the aligned apertures.

16. The materials removal assembly of claim 1 further comprising an operator coupling connected to the beam, the operator coupling comprising a bracket configured for engagement of the assembly by an operator vehicle for lifting and operating the assembly.

17. The materials removal assembly of claim 1 further comprising a counterweight slidably mounted to a second end of the beam, the second end being opposite the first end of the beam.

18. The materials removal assembly of claim 1 wherein the first coupling further comprises a suspension system to reduce the load of the assembly on a horizontal surface of the vehicle.

19. The materials removal assembly of claim 1 wherein the assembly is configured to remove materials of snow, hail, slush, ice, or sleet from a horizontal surface of a vehicle.

20. The materials removal assembly of claim 1 wherein the materials removal sub-assembly comprises an auger.

* * * * *